3,184,084
ADJUSTABLE BOOM TYPE PULL SHOVEL ATTACHMENT FOR CRANES AND THE LIKE
Thomas A. Hellander, 1510 18th St. S., Moorhead, Minn.
Continuation of application Ser. No. 140,303, Sept. 25, 1961. This application Dec. 6, 1963, Ser. No. 330,517
4 Claims. (Cl. 214—134)

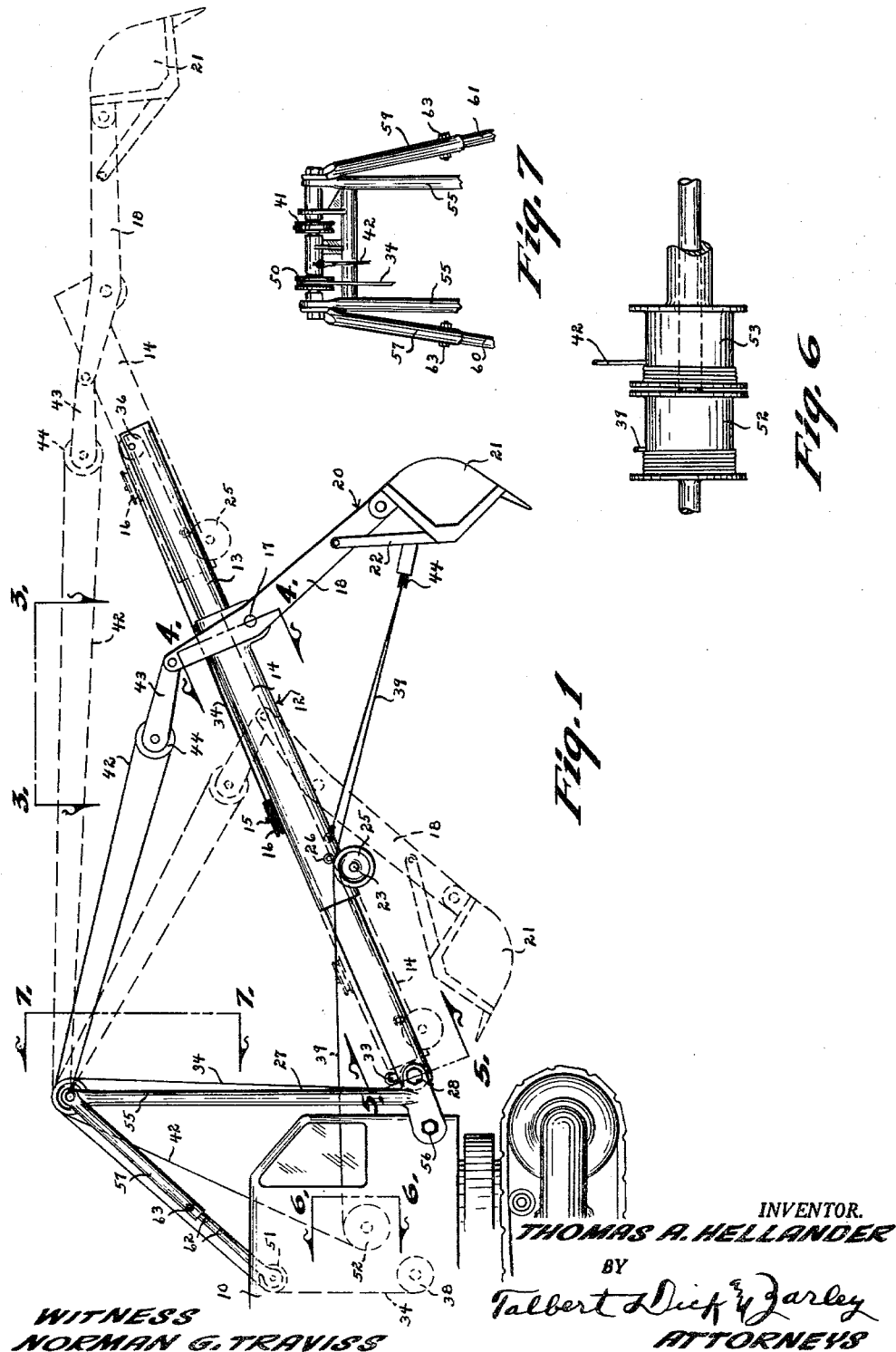

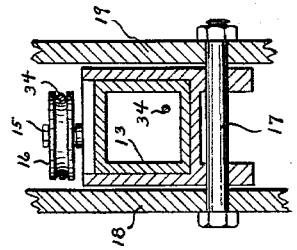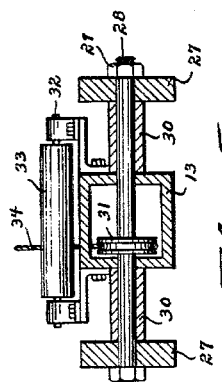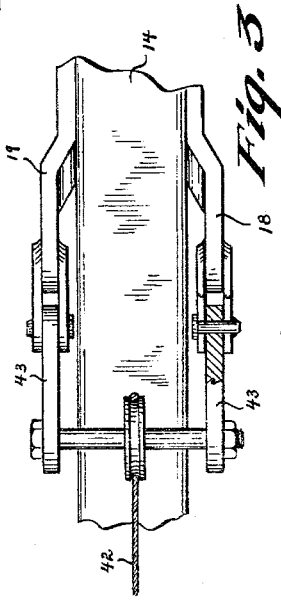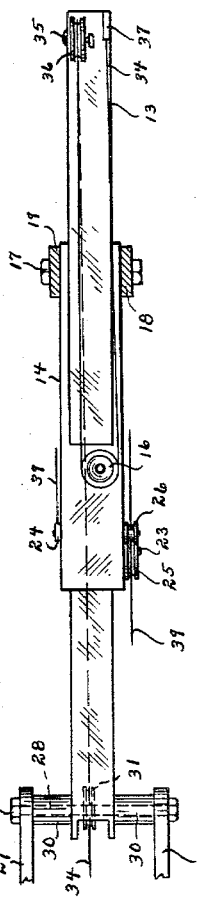

This invention relates to earth moving equipment, more particularly to an adjustable boom type pull shovel attachment for cranes or the like, and is a continuation of my application on an adjustable boom type shovel attachment for cranes and the like filed September 25, 1961, Serial Number 140,303.

Equipment for pulling or advancing earth shovel means is old. However, to produce a highly efficient and desirable earth moving device, many factors must be taken into consideration. Most such equipment uses a boom. Obviously, the longer the boom, the longer the reach. The higher the boom, the higher would be the dumping height and the lower the boom, the deeper the shovel is capable of extending into the earth. Also the shorter the boom, the greater the load handling capacity, the increased ability to work in less room and the capability of excavating a trench closer to the machine are desirable factors. Nevertheless, the problem is that when one desired feature is obtained, it well may hinder or eliminate other desired features. As an illustration, while a short boom is most efficient for certain work, obviously the operator of the equipment is handicapped in engaging the earth at points distant from the crane base or the like. Several problems were solved by the structure shown in my issued Patent No. 2,876,920, issued March 10, 1959, on a Mechanically Adjustable Boom Type Pull Shovel Attachment for Cranes. However, even by the structure shown in this patent it is obvious that the operator would not have a completely universally adjustable control for many conditions that arise in the moving of dirt or like. Although the shovel stick was mounted on a movable carriage, the operation was limited to the length of the boom. Also, because of the construction and arrangement of parts the shovel stick was limited in its swinging action in both directions long before it became substantially parallel with the boom.

Therefore, one of the principal objects of this invention is to provide an improved adjustable boom type pull shovel attachment for cranes that permits the shovel stick to swing inwardly or outwardly to positions substantially parallel with that of the longitudinal axis of the boom.

A still further object of this invention is to provide an improved adjustable boom type pull shovel attachment for cranes that permits the pivotal point of the shovel stick to function beyond the extreme forward end of the boom.

A still further object of this invention is to provide an improved adjustable boom type pull shovel attachment for cranes with a power controlled gantry while also providing an arrangement whereby the subject device can be mounted and operated without modification to the ordinary 3 drum basic machine.

Still another object of this invention is to provide an improved pull shovel attachment for cranes which includes a carriage slidably and guidably mounted on a boom and selectively positioned relative thereto, the carriage carrying both the bucket stick and guide sheaves for the pull cable, whereby the same relationship between the bucket stick and the pull cable is maintained at all times irrespective of the position of the bucket stick with respect to the ends of the boom.

Still further objects of this invention are to provide an improved adjustable boom type pull shovel attachment for cranes that is economical in manufacture and durable in use, that will readily fit and work properly on any basic machine, of which there are about 20 different brands manufactured in the U.S. at this time, with little or no modification and that will provide a working range to the extent that the machine will dig at a point remote from the machine as far as the machine can handle and then up to where the machine is standing and anywhere in between as dictated by the operator.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a side view of my device with broken lines showing the various possible positions of the shovel and its supporting stick;

FIG. 2 is a top plan view of the boom portion of the device;

FIG. 3 is an enlarged top plan view of the upper end portion of the bucket stick and illustrates how it is possible to swing in a wide arc without interference from the supporting boom and is taken from line 3—3 of FIG. 1;

FIG. 4 is an enlarged section view of end area of the carriage and is taken on line 4—4 of FIG. 1.

FIG. 5 is an enlarged cross sectional view of the device taken on line 5—5 of FIG. 1.

FIG. 6 is a front view of the two drums taken on line 6—6 of FIG. 1, and

FIG. 7 is a front view of the frame portion taken on line 7—7 of FIG. 1.

In these drawings, FIG. 1 shows the forward end portion of an ordinary crane or like and which is generally designated by the numeral 10. It is to such a base equipment that I attach my device and which is generally designated by the numeral 12. The boom is generally designated by the numeral 13. This boom is of the usual box type construction. The numeral 14 designates an elongated carriage longitudinally slidably embracing the boom 13. Mounted on this carriage 14 is a pivot pin 15 which carries a sheave 16. Carried by the forward end of the carriage is a transverse shaft 17. Rotatably mounted on each outer end portion of the shaft 17 is a plate bar designated by the numerals 18 and 19 respectively. These two bar plates 18 and 19 provide the major portion of the bucket or shovel stick and which is generally designated by the numeral 20. The two bar plates 18 and 19 are structurally reinforced and their lower ends support the usual removable bucket or shovel 21 as shown in FIG. 1. The numeral 22 designates brace means for spacing the shovel relative to the longitudinal axis of its stick. Carried at the other end of the carriage is a second transverse shaft 23. At one end of the shaft 23 is mounted a fixed anchoring sheave 24. At the other end of the shaft 23 is a sheave 25. A smaller sheave 26 is mounted just above and in alignment with the sheave 25. The crane 10 is provided at its forward part with an upwardly extending frame standard 27 or gantry, which is adjustably swingably secured to the machine 10 and which will later be described in detail. Extending between the lower parts of the frame standard 27 is a boom mounting pin 28. This pin is retained in place by nuts 29 as shown in FIG. 5. In order that the boom 13 may be mounted on the boom mounting pin 28, it is carried by the boom sleeves 30 which are aligned with and receives the pin 28 as shown in FIG. 2. The opposite ends of the sleeves 30 are spaced apart and disposed therebetween is a sheave 31 which in turn is suitably journaled on the boom pin 28. Carried by the boom 13 is a pair of transversely spaced brackets carrying a pin 32 and mounted upon which is the guide roller 33. It will be seen, therefore, that the structure of the boom 13 and the structure of the carriage 14 is such that only the guided movement of the carriage 14 is allowed along the length of the boom 13. However, a most important feature is that the elongated carriage may slidably move to a forward point where its forward end and the pivot point of the bucket stick is substantially beyond that of the forward end of the boom. This feature is illustrated by broken lines in FIG. 1 and, therefore, with my device it is possible to use a relatively short boom but also obtain the effect of a long boom. In order that the carriage 14 may be selectively positioned along the length of the boom 13, to properly position the bucket stick 20 there is provided a cable 34 which has one end thereof mounted on a drum 38 of the crane. The cable 34 passes first upwardly over the sheave 50 which is rotatably mounted at the top of the frame 27 thence downwardly and under the sheave 31 and along the length of the boom 12. A guiding sheave 51 may be imposed between the drum 38 and sheave 50. The pivot point of the bucket stick is at the forward end of the carriage. Carried by the boom at its outer end is a transverse shaft 35 which carries a sheave 36 and over which the cable 34 is entrained. The cable 34 is then further entrained around the sheave 16 and is then returned and anchored to the pin or like 37 at the outer end of the boom. By anchoring the cable 34, inward movement of the carriage 14 is prevented. Further, by reeling in on the cable 34 the carriage 14 may be pulled outwardly to a desired position and due to the location of the sheave on the carriage, the carriage may be moved to a point beyond the end of the boom as herebefore discussed. To move the carriage rearwardly, the drum 38 and cable 34 are released and the cable 42 is reeled in. When the desired position of the carriage has been obtained, the drum 38 is locked. In addition to the cable 34, the crane will also include the customary pull cable 39. The pull cable is reeled on a suitable drum 52 of the crane and normally passes over the roller 33. However, in a lowered position of the boom, the pull cable will ride on the roller 33. The cable 39 passes outwardly above the boom and over the sheave 25, downwardly under the sheave 26 and is engaged around a sheave 44 which is carried by the bucket stick brace 22. The cable 39 then returns to the sheave or like 24 and is secured thereon. By pulling on the cable 39, the bucket 21 may be pulled toward the crane in digging operation.

Carried by the upper ends of the frame support 27 is a pulley sheave 41. Entrained over the sheave 41 is the hoist cable 42 which enters into the crane and is reeled on a suitable drum 53 mounted therein. The upper end of each of the bar plates 18 and 19 that make up the bucket stick have hingedly secured thereto a link 43. These two links 43 are spaced apart as shown in FIG. 3 and are of such spacing that their pivoted ends and the upper end portions of the plate bars 18 and 19 can extend downwardly to each side respectively of the boom. Rotatably mounted between the two outer ends of the links 43 is a sheave 44. The cable 42 passes upward from the drum 53, thence over the sheave 41, around the sheave 44 and back to the vicinity of the sheave 41 where it is deadended, to the upper end of the frame standard 27. By tensioning the cable 42 the bucket and/or boom may be hoisted in the conventional manner. From the foregoing description of parts it will be seen that the carriage may be selectively positioned in any position along the length of the boom and may be even moved to a point where its forward end is beyond the end of the boom. It will also be obvious by the upper end of the stick being split and extending to each side of the boom respectively the upper end of the split stick may swing to positions forforwardly or backwardly wherein they will fall below the upper plane of the boom. This means that the bucket stick may swing outwardly to a position where it is almost parallel with the longitudinal axis of the boom. In the same manner the stick may swing inwardly to bring the shovel closely adjacent the bottom rear end of the boom.

In any pull shovel, it is highly desirable that each end of the swinging arc of the bucket stick relative to the boom be such that the bottom of the bucket will attain a position at least vertical to the boom both when in the dumping position and when in the bucket loaded position. In the case of the dumping position, this is desirable in order to facilitate dumping sticky material. It is also necessary for the bucket floor to be in a vertical position when chopping is engaged in as is commonly the case. In the other end of the swinging arc, the bucket should also be in a vertical position to the boom to retain free flowing materials such as sand in the loaded bucket. The structure of the pull shovel with the carriage on the boom creates a problem here in that the boom extends forward at times as well as rearward to the boom-bucket stick pivot point. This problem is further complicated due to the fact that in order to obtain proper operation of the pull shovel it is vitally necessary that the bucket tooth point, bucket stick-boom pivot point and the bucket stick-hoist cable pivot point be placed in certain positions in relation to each other.

In the pull shovel attachment, the hoist cable is, of course, used in adjusting the vertical position of the pull shovel. However, the arrangement of the hoist cable on the upper bucket stick also permits the use of gravity to swing the bucket from the loaded to the dumping position. Further, this arrangement is such that during the normal digging cycle of the bucket stick, with the hoist line held secure, the bucket will follow a gradual upward plane. This last makes it possible for the operator to easily control the rate of material entering the bucket and, also, makes it a simple matter to dig to a desired grade because all the operator must do during the digging cycle is ease off on the hoist brake as necessary to lower the bucket to the desired elevation during the digging cycle.

The bucket stick-hoist cable assembly pivot point must be properly placed laterally to an axis vertical to the bucket stick and intersecting the bucket stick-boom pivot point and the bucket tooth point in order that the bucket may dump properly. The vertical spacing of the bucket stick-hoist cable assembly pivot point and the bucket stick-boom pivot point must also be proper for the reasons that this distance must be great enough to allow for the proper dumping of the bucket and to allow the bucket to describe the proper upward inclined plane during the digging cycle. Still, this distance must be as short as possible to hold the dropping of the attachment, including the bucket, to a minimum during the dumping cycle. This last is an undesirable side effect of the pull shovel mechanism and is, of course, to be avoided to the extent possible consistent with proper operation of the pull shovel.

There are also pros and cons concerning the vertical spacing between the bucket stick-boom pivot point and the bucket tooth point. However, they are not pertinent to this application and, therefore, will not be discussed here.

The inventor has built and operated adjustable boom type pull shovels successfully for several years that were somewhat restricted in performance due to the inability of the bucket to describe an arc of desirable scope. However, he has now solved this problem by placing the boom-bucket stick pivot point below the boom and as otherwise described previously herein and as shown on the drawings.

In basement type house construction, after the basements have been dug, it is usually necessary that suitable trenches be dug for the pouring of the footings. Accordingly, these footing trenches must be dug by hand. This is expensive and time consuming. With the present invention, because of the relatively great length of the boom and because the bucket stick 10 may be selectively positioned along the boom, the crane utilizing my device may be positioned at one corner of the house on the solid ground adjacent the portion of the ground dug away for the basement and when aligned with the footing to be dug, may sit in that one position and dig such footing by merely moving the bucket stick 20 towards the crane as is necessary in the digging operation.

It will be apparent that the present will be highly desirable for this one use alone. However, the invention is not limited to this particular use and may be utilized to advantage in many operations. For example, because of the particular relationship of the elements of the mechanically adjustable boom type pull shovel, deeper ditches can be dug, the earth may be dumped at a higher level, greater loads may be lifted than is possible with the normal boom because of the shortened position of the bucket stick, and a greater reach is attained. Yet this pull shovel will excavate a trench to a given grade up to substantially the spot where the crane is positioned. However, much of this versatility of my unit is made possible by my live gantry, or frame support, which I have generally designated herebefore by the numeral 27. This gantry has a substantially rectangular frame portion 55 which has its lower end hinged to the crane 10 by a bolt, shaft or like 56. Forward of the shaft 56 and on the lower end of the frame 55 is the bolt or like 28 for hingedly securing the rear end of the boom. Pivoted to the upper end of the frame portion 55 and each extending downwardly and rearwardly are two pipe members 57 and 59. These two pipe members 57 and 59 slidably telescope onto two bars 60 and 61 respectively as shown in FIG. 7. The two bars 60 and 61 have their lower ends pivoted to the crane 10, and each has a plurality of transverse spaced apart holes 62. The numeral 63 designates a bolt detachably extending through each of the pipe members 57 and 59, and detachably selectively through a hole 62 of the bar slidably mounted in that particular pipe member. By this arrangement, the swinging position of the frame portion 55 may be adjustably obtained and secured for that particular job at hand. With the bolts removed the manipulation of the various cables will lower or raise the upper end of the frame portion 55, and when the desired position of the gantry is obtained the bolts are accordingly replaced. But in some instances it may be desirable to leave the bolt out and control the position of the frame by the cables. Perhaps one of the most unique features of my device is the running of the cable 34 from the drum 38 upwardly and over one of the pulley wheels at the top of the gantry frame, thence downwardly to the vicinity of the pivoted end of the boom and thence forwardly in association with the boom and the carriage for moving the carriage forwardly or rearwardly on the boom. This particular arrangement of parts produces many advantages and in particular, swinging adjustment of the gantry frame, and on the basic machines upon which my equipment may be used it is most desirable that the gantry frame be adjustable and also controllable. As has been here before pointed out, the gantry frame may be somewhat swingably adjustable by the telescoping brace members. But in many situations at least the bolt means 63 will be removed and the gantry frame adjustably controlled by the use of one of the cables. In devices herebefore only two powered cable drums would suffice for operating the boom and shovel. If a movable gantry frame were used, usually the third drum of the basic machine and its cable were utilized to control the gantry frame. However, in my device the third drum is utilized for two purposes, i.e., the sliding and locking of the carriage and also the control of the pivoted gantry frame. The use of the third powered drum of the basic machine and its cable, if used solely for operating the carriage, would leave no power to the drum and cable to actuate the gantry frame. However, by placing the power cable 34 over the top of the gantry frame, the third drum and cable will successfully serve the two purposes required. Also by my arrangement and operation of parts, my device will fit on almost any standard basic machine without modification. It is often desirable to let the gantry frame forward to an inclined position for deep digging in order to have an advantageous cable angle for the best hoisting ability but when it is desirable to move the basic machine any distance we do have the important problem of clearance. Therefore and at that time it is often necessary to let the gantry assume a further forward inclined position in order to get the desirable low top clearance of the equipment. In other situations it will be desirable for the gantry to be almost vertical. In various operations therefor, it is necessary to frequently change the attitude of the gantry frame. To selectively position the gantry frame, the operator merely has to set the boom down and then in order to move the gantry forwardly, he reels in the hoist line cable while easing off on the boom slider carriage cable brake. To move the gantry frame into an upright position the operator eases off on the hoist brake drum and reels in on the boom hoist drum or carriage control line. From the foregoing it will be seen that by the use of three powered cable drums, I am able without modification to operate and control the gantry frame, the boom, the carriage, the stick, and the earth engaging element 21.

The pull shovel art should not be confused with the power shovel art. Although, to the casual observer they appear to be somewhat similar there are, and have to be for proper operation, important structural differences aside from the obvious fact that the power shovel bucket digs away from the machine whereas the pull shovel bucket digs towards the machine. A close study of the pull shovel and the power shovel art will reveal these structural differences. The power shovel is used primarily for excavation work where the material to be excavated lies above the base of the basic machine. The pull shovel is used primarily for excavations below the base of the basic machine. To convert one to the other merely by reversing the bucket creates an impractical, if not unworkable device.

Further, the improved adjustable boom type pull shovel attachment referred to herein has several important advantages, without accompanying disadvantages and reveals important structural differences when compared with the pull shovel attachment with the telescoping boom. These advantages are listed below:

(1) It is obviously desirable that the pull shovel be able to operate over as wide a range as possible, within the capability of the basic machine. The subject device readily permits this whereas the telescopic boom type construction falls far short of attaining this range.

(2) The subject device readily fits and operates on almost any ordinary unmodified basic machine. The telescopic boom type pull shovel requires the addition of a hydraulic system with its attendant pump, tubes, valves and fittings as well as additional controls for the operator to manipulate.

(3) The pull shovel boom is subjected to intense stresses, strain and shock. It is extremely difficult to build a telescopic boom to withstand the loads to which it will be subjected. Such a boom, of necessity, is cumbersome. The subject device has no such problem.

(4) The subject device is readily changeable from one basic machine to the other in the field whereas with the telescopic boom type of construction, such a change is very difficult and time consuming.

(5) The subject device can be built, sold and operated at a cost comparable to the ordinary fixed length boom type pull shovel attachment. The telescopic boom type pull shovel costs considerably more, several thousand dollars per unit, to build and then presents the expense of operating and maintaing a hydraulic system.

It is a proven fact that, at this writing, no other pull shovel type excavator can even approach the versatility, efficiency, performance and all around machine usefulness of the ordinary basic machine properly equipped with the subject device.

Some changes may be made in the construction and arrangement of my adjustable boom type pull shovel attachment for cranes and the like without departing from the real spirit and purpose of my invention, and it is my intention to cover by my claims, any modified forms of structure or use of mechanical equivalent which may be reasonably included within their scope.

I claim:

1. In combination with a crane of the type having at least three drums; an attachment comprising an elongated boom; means at one end of said boom operatively attaching said boom to said crane to swing in a vertical plane; an implement stick; said implement stick having a longitudinal axis thereof extending vertically through said boom; said implement stick having an upper portion projecting above said boom and a lower portion extending below said boom; an implement mounted on the lower end of said implement stick; a movable carriage mounted on said boom for movement longitudinally thereof; a transverse pivot pin carried by said carriage; said implement stick having an intermediate portion receiving said pivot pin whereby said implement stick is mounted for swinging movement on said pivot pin in a vertical plane passing through said boom; a gantry; a hoist cable reeled on one of said drums; said hoist cable being entrained on said gantry and extending therefrom towards said implement stick; means pivotally connecting said hoist cable to said upper portion of said implement stick; a pull cable reeled on a second one of said drums; means pivotally connecting said pull cable to said lower portion of said implement stick; said hoist cable, in cooperation with said pull cable and with gravity, supporting and controlling the vertical position of said implement stick; said implement, said boom and said carriage; said pull cable, in cooperation with said hoist cable and with gravity, operating said implement stick and said implement; means at one end of said gantry operatively attaching said gantry to said crane; means to retain the position of said gantry; a third cable reeled on a third one of said drums; said third cable entrained on said gantry and operatively secured to said carriage; said third cable, in cooperation with said hoist cable, operating said gantry and positioning and restraining said carriage.

2. In combination with a crane of the type having at least two drums; an attachment comprising an elongated boom; means at one end of said boom operatively attaching said boom to said crane to swing in a vertical plane; an implement stick; said implement stick having a longitudinal axis thereof extending vertically through said boom; said implement stick having an upper portion projecting above said boom and a lower portion extending below said boom; an implement mounted on the lower end of said implement stick; a movable carriage mounted on said boom for movement longitudinally thereof; a transverse pivot pin carried by said carriage; said implement stick having an intermediate portion receiving said pivot pin whereby said implement stick is mounted for swinging movement on said pivot pin in a vertical plane passing through said boom; a hoist cable reeled on one of said drums; means pivotally connecting said hoist cable to said upper portion of said implement stick; a pull cable reeled on a second one of said drums; means pivotally connecting said pull cable to said lower portion of said implement stick; said hoist cable, in cooperation with said pull cable and with gravity, supporting and controlling the vertical position of said implement stick, said implement, said boom and said carriage; said pull cable, in cooperation with said hoist cable and with gravity, operating said implement stick and said implement; means connected to said carriage for anchoring said carriage against movement relative to said boom; said upper portion of said implement stick comprising an elongated member offset relative to said boom and said carriage to operate without contacting said boom or said carriage; said upper portion of said implement stick, where said hoist cable means is pivotally connected, being swingable to a point below the top plane of said boom and said transverse pivot pin having its longitudinal axis below the bottom plane of said boom.

3. In combination with a crane of the type having at least two drums; an attachment comprising an elongated boom; means at one end of said boom operatively attaching said boom to said crane to swing in a vertical plane; an implement stick; said implement stick having a longitudinal axis thereof extending vertically through said boom; said implement stick having an upper portion projecting above said boom and a lower portion extending below said boom; an implement mounted on the lower end of said implement stick; a movable carriage mounted on said boom for movement longitudinally thereof; a transverse pivot pin carried by said carriage; said implement stick having an intermediate portion receiving said pivot pin whereby said implement stick is mounted for swinging movement on said pivot pin in a vertical plane passing through said boom; a hoist cable reeled on one of said drums; means pivotally connecting said hoist cable to said upper portion of said implement stick; a pull cable reeled on a second one of said drums; means pivotally connecting said pull cable to said lower portion of said implement stick; said hoist cable, in cooperation with said pull cable and with gravity, supporting and controlling the vertical position of said implement stick, said implement, said boom and said carriage; said pull cable, in cooperation with said hoist cable and with gravity, operating said implement stick and said implement; means connected to said carriage for anchoring said carriage against movement relative to said boom; said upper portion of said implement stick comprising an elongated member offset relative to said boom and said carriage to operate without contacting said boom or said carriage; said upper portion of said implement stick, where said hoist cable means is pivotally connected, being swingable to a point below the top plane of said boom.

4. In combination with a crane of the type having at least three drums; an attachment comprising an elongated boom; means at one end of said boom operatively attaching said boom to said crane to swing in a vertical plane; an implement stick; said implement stick having a longitudinal axis thereof extending vertically through said boom; said implement stick having an upper portion projecting above said boom and a lower portion extending below said boom; an implement mounted on the lower end of said implement stick; a movable carriage mounted on said boom for movement longitudinally thereof; a transverse pivot pin carried by said carriage; said implement stick having an intermediate portion receiving said pivot pin whereby said implement stick is mounted for swinging movement on said pivot pin in a vertical plane passing through said boom; a gantry; a hoist cable reeled on one of said drums; said hoist cable being entrained on said gantry and extending therefrom towards said implement stick; means pivotally connecting said hoist cable to said upper portion of said implement stick; a pull cable reeled on a second one of said drums; means pivotally connecting said pull cable to said lower portion of said implement stick; said hoist cable, in cooperation with said pull cable and with gravity, supporting and controlling the vertical position of said implement stick; said implement, said boom and said carriage; said pull cable, in cooperation with said hoist cable and with gravity, operating said implement stick and said implement; means at one end of said gantry operatively attaching said gantry to said crane; means to retain the position of said gantry; a third cable reeled on a third one of said drums; said third cable entrained on said gantry and operatively secured to said carriage; said third cable, in cooperation with said hoist cable, operating said gantry and positioning and restraining said carriage; said upper portion of said implement stick comprising an elongated member offset relative to said boom and said carriage to operate without contacting said boom or said carriage; said upper portion of said implement stick, where said hoist cable means is pivotally connected, being swingable to a point below the top plane of said boom.

References Cited by the Examiner
UNITED STATES PATENTS 2,876,920  3/59  Hellander _____ 214—134

HUGO O. SCHULZ, Primary Examiner.